Jan. 31, 1956

P. E. BESSIERE 2,733,361

ELECTRO-DYNAMIC BRAKES

Filed Jan. 14, 1953

INVENTOR
PIERRE ETIENNE BESSIERE
BY
Bailey, Stephens + Huettig
ATTORNEYS

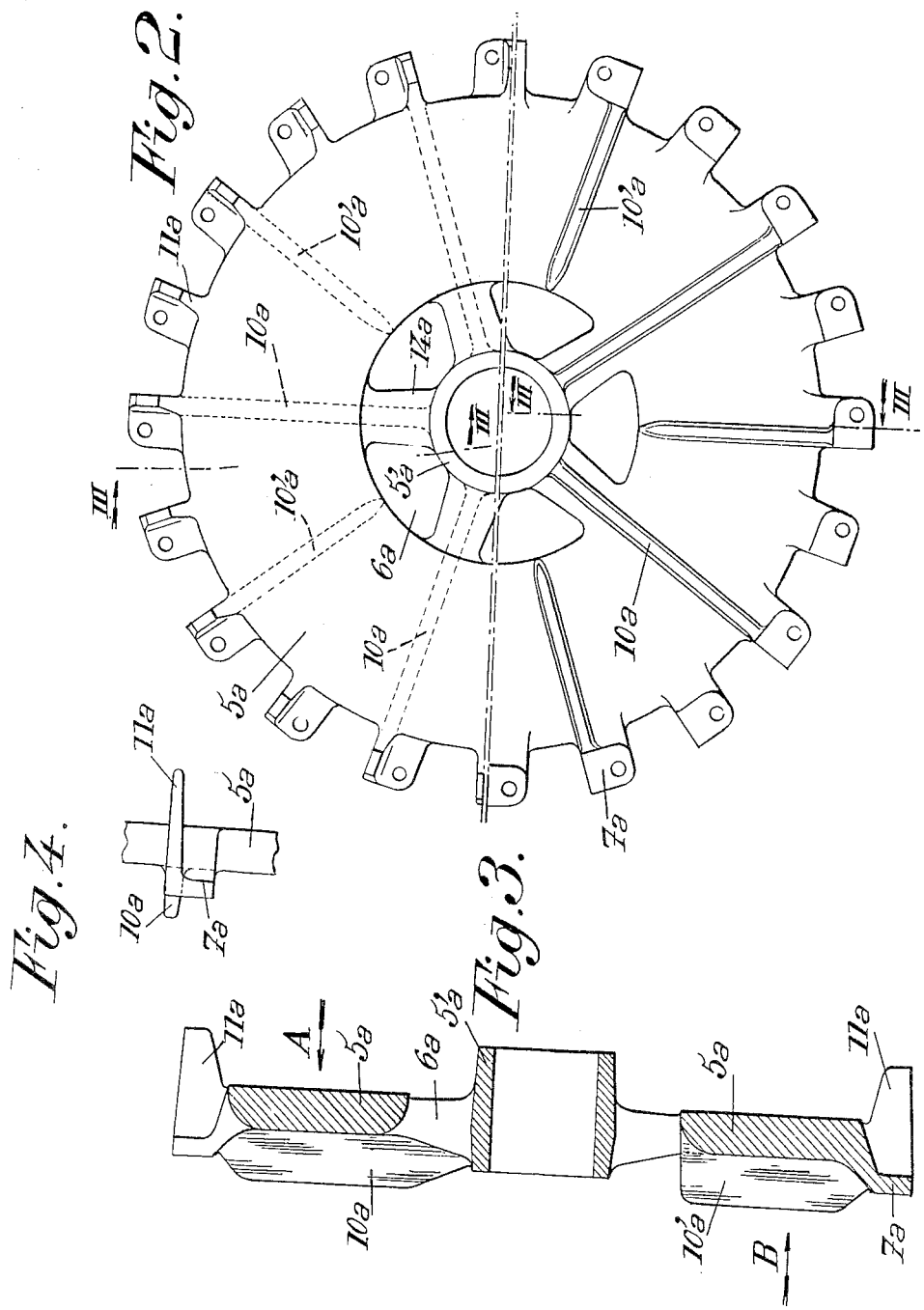

Jan. 31, 1956  P. E. BESSIERE  2,733,361
ELECTRO-DYNAMIC BRAKES
Filed Jan. 14, 1953  5 Sheets-Sheet 3
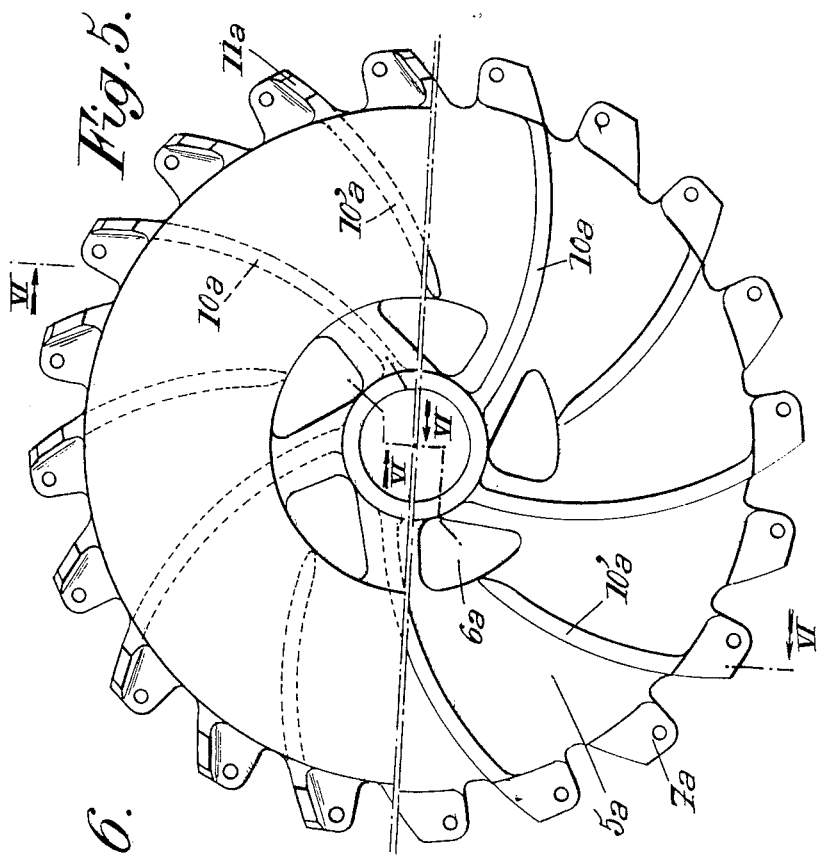
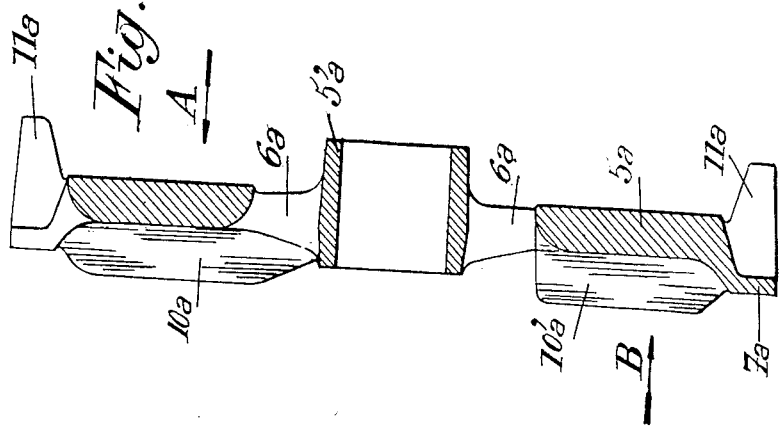
INVENTOR
PIERRE ETIENNE BESSIERE
BY
Bailey, Stephens & Huettig
ATTORNEYS Jan. 31, 1956

P. E. BESSIERE 2,733,361

ELECTRO-DYNAMIC BRAKES

Filed Jan. 14, 1953

INVENTOR
PIERRE ETIENNE BESSIERE

BY
Bailey, Stephens & Huettig
ATTORNEYS

Jan. 31, 1956 P. E. BESSIERE 2,733,361
ELECTRO-DYNAMIC BRAKES
Filed Jan. 14, 1953 5 Sheets—Sheet 5
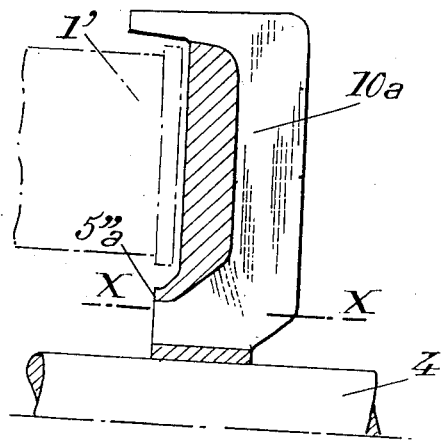
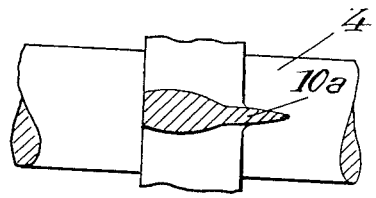
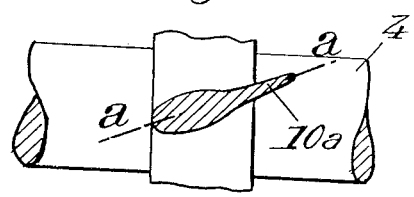
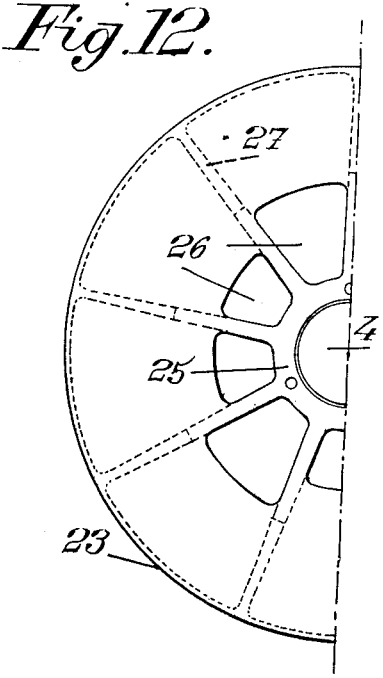
INVENTOR
PIERRE ETIENNE BESSIERE
BY
Bailey, Stephens + Huettig
ATTORNEYS

United States Patent Office 2,733,361
Patented Jan. 31, 1956

2,733,361
ELECTRO-DYNAMIC BRAKES

Pierre Etienne Bessière, Paris, France, assignor, by mesne assignments, to Telma, Paris, France, a society of France Application January 14, 1953, Serial No. 331,160

Claims priority, application France January 17, 1952

13 Claims. (Cl. 310—93)

The present invention relates to electro-dynamic brakes of the type in which a rotor rigid with a shaft to be braked turns opposite pole pieces, preferably between two sets of pole pieces disposed on either side of this rotor and capable of creating Foucault currents in the rotor when the windings mounted on said pole pieces are energized by an electric current.

Of course these Foucault currents have, in addition to the braking effect, a heating effect which necessitates an intensive cooling at least of the rotor itself and preferably also of the shaft, of the shaft bearings and of the pole pieces with their windings.

The object of my invention is to provide a brake of this kind which is better adapted to meet the requirements of practice than those known at the present time.

It will first be supposed that the rotor is constituted by two discs carried by the shaft at a distance from each other, with apertures provided therein in the vicinity of the shaft to enable an air stream to flow radially through the space between the discs.

In this case, one feature of my invention consists in the fact that these discs are provided, at the periphery thereof, with lugs projecting inwardly, that is to say toward the space between the two discs, and this preferably to such a degree that the respective lugs of the two discs contact one another, bolts or analogous means of short length being provided for fixing the lugs of the two discs to one another.

In the same case, and preferably in combination with the above mentioned feature, another feature of my invention consists in the fact that there are provided, on the internal faces of the discs, ribs or fins extending from the periphery of each disc to the hub thereof, the portions of said ribs close to the hub extending along the arms which separate from each other the inlets of the air passages provided in the disc in the vicinity of its hub, whereas the outer portions of these ribs advantageously extend beyond the periphery of the corresponding disc to form peripheral blades which preferably project from the outer surface of the disc.

Still in the same case and in particular in combination with the first mentioned feature, another feature of my invention consists in the fact that fans having helical blades which blow air into the apertures of the discs are fixed on the shaft of the rotor and on either side of said rotor.

In the case of an electric brake the pole pieces of which are fixed on side plates constituting the side walls of the brake, and in particular in the case of a brake made according to the first feature above mentioned, another feature of my invention consists in the fact that said side plates are provided with apertured flanges extending inwardly, the two side plates located on either side respectively of the rotor being connected together by bolts or analogous means secured to said flanges.

In the last mentioned case, still another feature of my invention consists in the fact that fans are secured to the opposed end of the brake shaft, which ends project outwardly from the bearings of this shaft, and preferably to the coupling discs carried by these shaft ends, these fans blowing air onto the bearings and the outer surfaces of the side plates which carry these bearings.

Preferred embodiments of my invention will be hereinafter described with reference to the accompanying drawings, given merely by way of example, and in which:

Fig. 1 is an axial sectional view of a brake made according to my invention.

The top half of Fig. 2 shows the top half of one of the discs of a double disc rotor as seen from one of the sides of the disc (arrow A of Fig. 4) and the bottom half of Fig. 2 shows the bottom half of the same disc seen from the other side (arrow B).

Fig. 3 shows the disc of Fig. 2, in section on the line III—III of Fig. 2.

Fig. 4 is a plan view of a portion of the periphery of the disc shown by Figs. 2 and 3.

Figs. 5 and 6 are sectional views, analogous to Figs. 2 and 3 respectively, of a disc belonging to a double disc rotor and made according to another embodiment of my invention.

Figs. 9 and 10 are respectively a radial section and a horizontal section on the line X—X of Fig. 9 of still another construction according to my invention.

Fig. 11 is a sectional view analogous to that of Fig. 10, corresponding to a modification.

Fig. 12 is an elevational view of one half of one of the fans fixed on the coupling discs mounted at the ends of the brake shaft.

Figure 1:
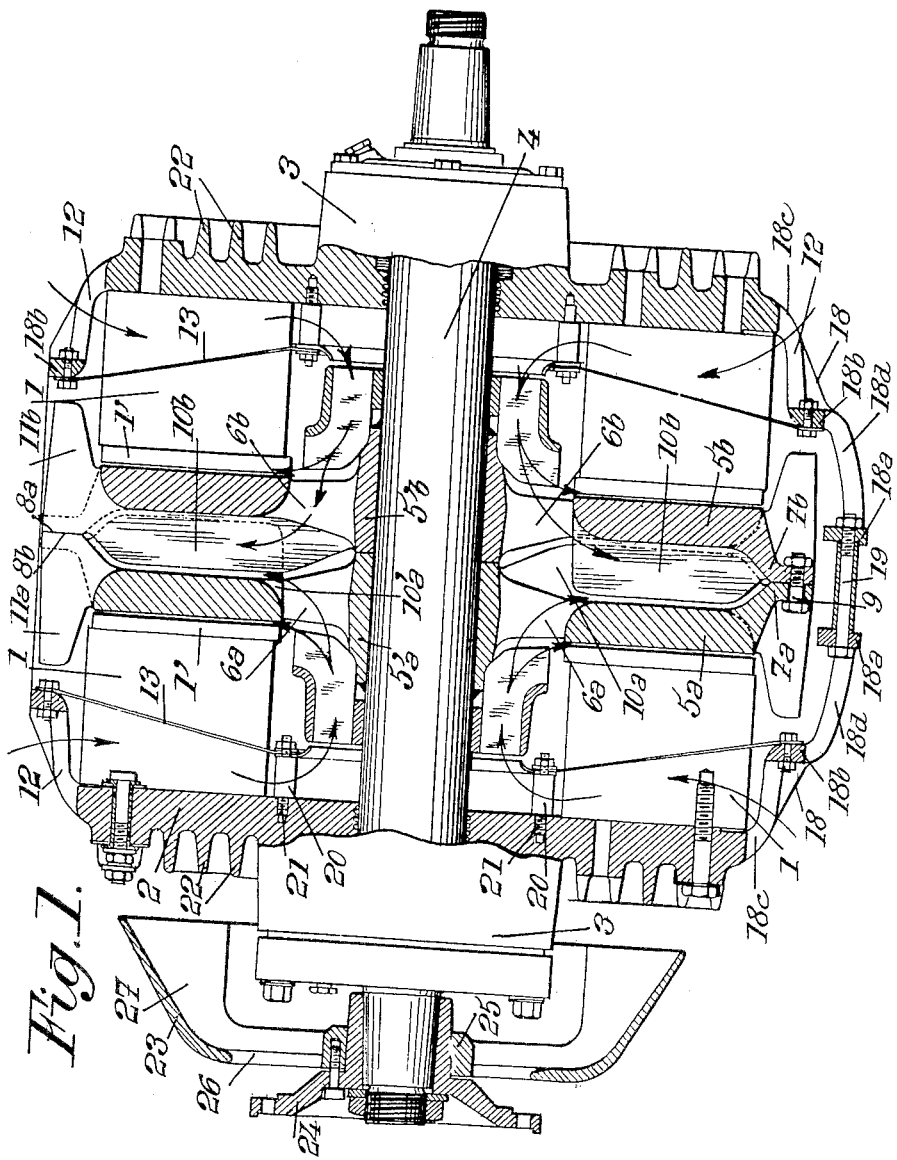

The brake according to my invention may be fitted on an automobile vehicle, for instance a motor truck, on a crane, on a mine sounding apparatus and so on.

The general structure of the brake comprises, on the one hand, an inductor including pole pieces and, on the other hand, an armature in which are created, due to a relative movement between the inductor and the armature, Foucault or analogous currents. The armature is coupled with the part to be braked so that it rotates with respect to the inductor which has no rotary movement. Hereinafter, the rotating armature will be called rotor.

The inductor includes two sets of pole pieces 1, provided with windings and fixed in a frame, preferably of a magnetic metal, constituted substantially by two side plates 2 located on either side of the rotor and supporting the bearings 3 of the rotor shaft, whereby the rotor turns, when its shaft is rotating, between the pole pieces 1 of the inductor, which are carried by frame 2 fixed to the chassis of the vehicle fitted with the brake.

When the windings of the pole pieces are energized by an electric current, the magnetic flux thus obtained creates in the rotor Foucault currents or the like which produce both a braking and a heating of the rotor.

The rotor itself is constituted by two discs $5a$ and $5b$ rigid with shaft 4 and located at a distance from each other, apertures $6a$, $6b$, separated from each other by arms $14a$, $14b$, being provided in these discs in the vicinity of shaft 4, so as to enable an air stream to flow radially through the space between the discs. The number of these apertures and of these arms is preferably odd, for instance five.

In order to connect discs $5a$, $5b$ together, at the periphery of the rotor, each of them is fitted, according to the invention, with lugs $7a$, $7b$ which project inwardly, that is to say toward the space existing between discs $5a$ and $5b$. Preferably, the projection formed by each of these lugs corresponds to one half of the distance between discs 5a and 5b, whereby the lugs of the two discs which face each other are in contact along plane surfaces 8a, 8b. These lugs are provided with holes through which pass bolts 9 or analogous means for firmly applying lugs 7a and 7b against each other.

Furthermore, also according to my invention, lugs 7a, 7b extend radially to such a distance in the outward direction that the bolts 9 which serve to secure them together are at a radial distance from the axis of shaft 4 exceeding the radius of a geometrical cylinder surrounding the ends 1' of the pole pieces by an amount such that these bolts are practically outside of the magnetic field produced by these pole pieces. Thus, the bolts are not only located in a strong cooling air stream but are also outside of the portions of the rotor subjected to an intensive heating by the Foucault currents.

Finally, it should also be noted that the length of these bolts, owing to the shape of the above mentioned lugs, is very small, so that their expansion, already practically negligible due to their location outside of the magnetic field and to their intensive cooling, can have no practical effect on their tightening, even if their temperature increased slightly.

Still according to a feature of my invention, discs 5a, 5b are given a high rigidity by providing, on their outer faces, ribs 10a and 10b extending from the periphery of the discs to their hub 5a or 5b, the central portions of these ribs being located at the place where are arms 14a and 14b, whereby these arms constitute a kind of extension of the ribs between the hub 5a' or 5b' and the disc proper 5a or 5b.

Furthermore, the outer portions of these ribs extend beyond the periphery of the corresponding discs to form blades 11a, 11b which preferably project beyond the outer surface of discs 5a, 5b and preferably beyond a portion of the pole pieces and their windings, as shown by Fig. 1.

The discs proper 5a and 5b, inside which the Foucault currents are produced and which are subjected to a very high temperature, are thus surrounded on three of their sides by a rigid frame subjected to an intensive cooling action by the air streams so that it keeps its rigidity.

In order further to increase this rigidity, I may provide on the outer faces of discs 5a and 5b and at the level of the periphery of apertures 6a, 6b, a circular stiffening rib 5a'' or 5b'' extending on the inside of the zone of pole pieces 1' (see Fig. 9).

Due to the rigidity thus obtained, each of the discs 5a and 5b may be made relatively thin, which reduces the differences of temperature between the external faces located opposite the pole pieces and which are relatively hot and the internal surfaces of the discs, which are relatively cold.

Obviously, the above mentioned elements serving to stiffen the discs which constitute the rotor and in particular ribs 10a, 10b and blades 11a, 11b, increase the cooling surfaces of these discs and act as fan elements. In order further to increase the cooling surfaces and to improve the fan effect, I advantageously interpose, between ribs 10a and 10b, blades 10a' and 10b' the inner ends of which are at the level of the periphery of apertures 6a or 6b, where their outer ends may be extended by the projecting peripheral blades 11a or 11b.

Advantageously, ribs 10a and 10b and blades 10a' and 10b' are given such a length in the axial direction and such an arrangement that these ribs and blades are mutually interposed when the two discs are mounted on shaft 4.

Preferably, at least some of the peripheral blades 11a, 11b are connected with some of the lugs 7 in such manner that every group including a blade and a lug constitutes an angular element, whereby the blades exert a direct cooling effect on these lugs.

Concerning ribs 10a, 10b and blades 10a', 10b', they may either be radial and rectilinear (see Figs. 2 to 4) or have a curvilinear shape (see Figs. 5 and 6) so as better to adapt themselves to the form of the air stream lines which, under the fan effect of the rotor, flow through the space between discs 5a and 5b. In this last case, the blades 11a and 11b, provided at the periphery of the discs, have an inclination in accordance with that of the ends of ribs 10a, 10b or blades 10a', 10b'.

Of course, care must be taken to leave in free communication with the atmosphere the periphery of the rotor so that the cooling air streams can escape freely into said atmosphere.

These air streams enter the brake for instance through apertures provided in the side plates 2 in the vicinity of bearings 3, or, as shown by the drawings, through apertures 12 provided at the periphery of side plates 2. In this last case, intermediate partitions 13 are provided. Consequently, air flows first in the centripetal direction, cooling the windings of the pole pieces. Then this air undergoes, in the vicinity of shaft 4, a change of direction to reach the central portion of the discs 5a and 5b of the rotor.

A portion of this air enters at this place, through apertures 6a and 6b, the space between the two discs and flows through this space in a centrifugal direction, whereas another portion of this air flows, also in the centrifugal direction, along the outer faces of discs 3a and 3b. The general direction of the air streams is indicated by arrows in Fig. 1.

Figure 8:
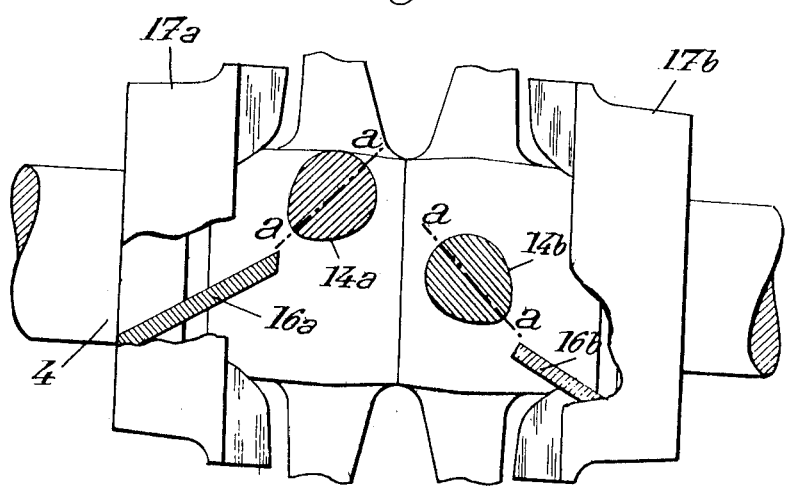
Fig. 8 is a horizontal section on the line VIII—VIII of Fig. 7.

According to still another feature of the invention, arms 14a, 14b, which are interposed between the apertures provided in each disc and which connect its outer portion with its hub, are given an elongated section the main axis a—a of which (Figs 8 and 11) is inclined with respect to the axis of the rotor shaft 4, in order to correspond at least approximately with the direction of the air streams passing through said apertures. Preferably, the number of arms 14 is odd. For instance it is equal to 5.

The above described arrangement is particularly useful when it is applied in combination with still another feature which consists in fixing on shaft 4, on either side of the rotor, axial fans 15a, 15b having helical blades 16a, 16b, which blow air into the apertures 6a, 6b of discs 5a, 5b, these apertures being located between arms 14a, 14b. The blades 16a and 16b of these fans are advantageously disposed, with respect to arms 14a, 14b, in such manner as to cause air to enter the apertures between these arms with as little shocks as possible.

Figure 7:
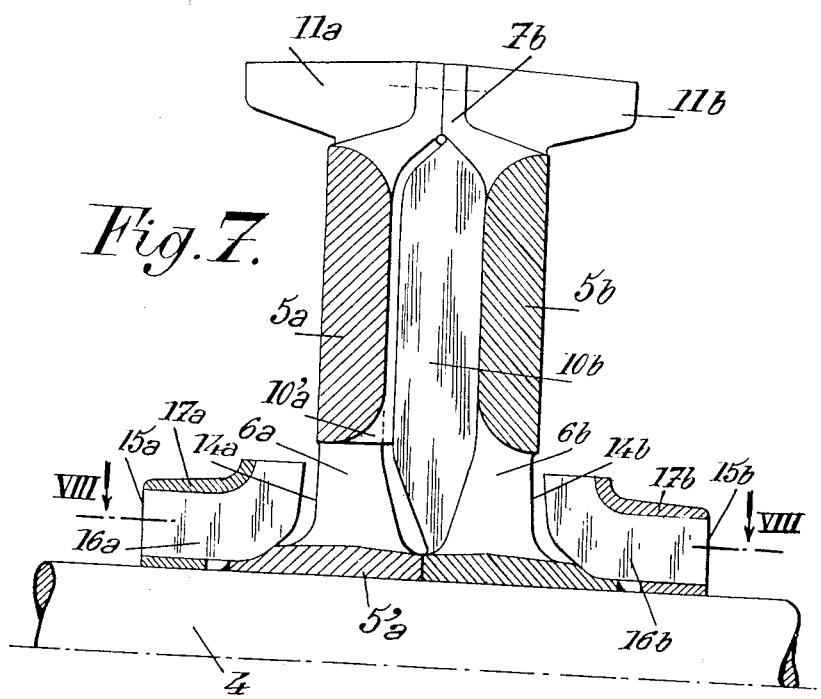
Fig. 7 is a section of the upper half of a double disc rotor made according to my invention and of the fans located on either side of this rotor.

Furthermore, blades 16a, 16b are advantageously made to extend in the direction toward the rotor beyond the annular casing 17a, 17b which surrounds them (see Figs. 7 and 8), so as to enable a portion of the air which has flown through axial fans 15a, 15b to cool the external surfaces of the discs 5a, 5b of the rotor.

Still other features of my invention relate to the arrangement of the side plates 2 on which the pole pieces 1 are mounted. According to one of these features, these side plates are provided with apertured flanges 18, so that each side plate with its flange constitutes a kind of cup and the two flanges located on either side of the rotor are connected together by bolts 19 of relatively small length which are fixed to the edge 18a of said flanges 18 (see Fig. 1). Preferably, the apertures provided in each of the flanges 18 form two groups disposed on either side of an annular part 18b connected by arms 18c and 18d respectively to side plates 2 and to the free edges 18a of flanges 18. Advantageously, annular member 18b is used for fixing thereto the outer edge of the corresponding partition whereas the inner edge of this partition is fixed to the corresponding side plate by means of a piece 20 and bolts 21. Thus the apertures located between annular member 18b and side plate 2 constitute the cooling air inlet apertures 12, whereas the apertures located between annular member 18b and edge 18a belong to those which let cooling air flow out to the outside, after this air has flown along the brake parts to be cooled.

According to still another feature of my invention, the side plates 2 are provided on their outer face with fins 22 of closed contour and preferably concentric with the shaft. These fins on the one hand increase the cooling surface of these side plates and on the other hand facilitate the passage of the magnetic flux through these side plates.

Finally, according to still another feature of my invention, fans 23 are fixed to the opposed ends of the brake shaft 4, which ends project outwardly from the bearings of this shaft, these fans blowing air onto bearings 3 and onto the external surfaces of side plates 2.

Fig. 1 shows only one fan disposed on one of the ends of shaft but it is clear that the other end must carry such a fan.

According to a particularly advantageous embodiment of this last mentioned feature, these fans 23 are mounted on the coupling discs 24 which are fixed directly on the ends of shaft 4.

These fans may be arranged in various ways. According to the particularly simple arrangement illustrated by Fig. 1, they are constituted by a cup-shaped wall rigid with a hub 25 and in the bottom of which are provided the air inlet apertures 26. Furthermore, inside wall 23 are provided ribs 27 playing the part of fan blades and having preferably the angular shape shown by Fig. 1, whereby they can extend axially over a portion of the length of bearings 3.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electro-dynamic brake which comprises in combination a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, lugs carried by said discs at the peripheries thereof, the lugs of the two discs extending in the direction of said axis toward one another so as to be in contact along a plane located between these two discs, and means for securing the corresponding lugs of said two discs together, said securing means being disposed at a distance from the axis of rotation of the rotor greater than the radius of the geometrical cylinder surrounding the pole pieces by an amount such that these securing means are located outside of at least the main portion of the magnetic field produced by said pole pieces when their windings are energized by an electric current.

2. An electro-dynamic brake which comprises in combination a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, a plurality of ribs carried by the face of each of said discs which is turned toward the other disc, said ribs extending from the periphery of each disc to the hub thereof, the portions of said ribs close to said hub extending along the portions of the discs which separate from one another the apertures provided in said discs in the vicinity of its hub.

3. An electro-dynamic brake which comprises in combination a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, lugs carried by said discs at the peripheries thereof, the lugs of the two discs extending in the direction of said axis toward one another so as to be in contact along a plane located midway between these two discs, means for securing the corresponding lugs of said two discs together, a plurality of ribs carried by the face of each of said discs which is turned toward the other disc, said ribs extending from the periphery of each disc to the hub thereof, the portions of said ribs close to said hub extending along the portions of the discs which separate from one another the apertures provided in said discs in the vicinity of its hub, the outer portion of these ribs extending beyond the periphery of the corresponding disc to form peripheral blades projecting in the axial direction into the space on the outside of said two discs.

4. A brake according to claim 2, further including a circular stiffening rib carried by the outer face of each of said discs located in the space limited by the corresponding pole pieces and at the level of the periphery of the apertures provided in said discs.

5. A brake according to claim 3, further including a circular stiffening rib carried by the outer face of each of said discs located in the space limited by the corresponding pole pieces and at the level of the periphery of the apertures provided in said discs.

6. A brake according to claim 2, further including a plurality of blades carried by said discs on the same faces thereof which already carry said ribs, the last mentioned blades being disposed in the interval between said ribs and extending from the periphery of each disc to the outer periphery of one of said apertures.

7. A brake according to claim 3, further including a plurality of blades carried by said discs on the same faces thereof which already carry said ribs, the last mentioned blades being disposed in the interval between said ribs and extending from the periphery of each disc to the outer periphery of one of said apertures.

8. A brake according to claim 3 in which said peripheral blades start from at least some of said lugs, each blade and the lug from which it starts forming together a L-shaped structure.

9. An electro-dynamic brake which comprises in combination a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, and two fans carried by said shaft respectively on either side of said rotor, said fans having helical blades arranged to blow air into said apertures of said discs.

10. An electric brake according to claim 9 further including an annular part surrounding a portion of the blades of said fans, said fan blades extending beyond said annular part in the direction of the rotor.

11. A brake according to claim 9, in which the portions of the discs extending between said apertures thereof and which form arms connecting the outer peripheral portion of each disc with its hub portion have an elongated section the axis of which is inclined with respect to the axis of said shaft so as to extend approximately in the direction of the air streams passing through said apertures.

12. An electro-dynamic brake which comprises, in combination, a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, lugs carried by said discs at the peripheries thereof, the lugs of the two discs extending in the direction of said axis toward one another so as to be in contact along a plane located between these two discs, means for securing the corresponding lugs of said two discs together, and peripheral blades integral with said lugs respectively and located substantially in radial planes passing through the shaft axis, each of said blades extending laterally from the lug with which it is integral toward the outside with respect to the space between said discs.

13. An electro-dynamic brake which comprises, in combination, a frame, a shaft to be braked journalled in said frame, two sets of pole pieces carried by said frame distributed about the axis of said shaft, a rotor fixed to said shaft including two discs located at a distance from each other, said discs being provided in the vicinity of said shaft with apertures so as to enable an air stream to flow through said apertures and thence radially through the space between said discs, lugs carried by said discs at the peripheries thereof, the lugs of the two discs extending in the direction of said axis toward one another so as to be in contact along a plane located between these two discs, means for securing the corresponding lugs of said two discs together, peripheral blades integral with said lugs respectively and located substantially in radial planes passing through the shaft axis, each of said blades extending laterally from the lug with which it is integral toward the outside with respect to the space between said discs, and ribs carried by the face of each of said discs which is turned toward the other disc, said ribs being located in at least some of the radial planes in which are located said blades, so that in each of said planes there is, on the outer side of one disc, one blade, and on the inner side of the same disc, one rib, said disc and said rib being integral with one lug.

References Cited in the file of this patent
UNITED STATES PATENTS

| | | |
|---|---|---|
| 2,068,820 | Sarazin | Jan. 26, 1937 |
| 2,110,663 | Gouldthorpe | Mar. 8, 1938 |
| 2,503,704 | Bessiere | Apr. 11, 1950 |
| 2,575,000 | Bessiere | Nov. 13, 1951 |